United States Patent Office 3,476,766
Patented Nov. 4, 1969

3,476,766
CERTAIN 2,4 - DIARYLTHIAZOLE-5-ALKANOIC ACIDS AND DERIVATIVES THEREOF
Kevan Brown, Woodley, England, assignor, by mesne assignments, to John Wyeth & Brother Limited, Taplow, Maidenhead, England, a British company
No Drawing. Filed Nov. 2, 1967, Ser. No. 679,999
Claims priority, application Great Britain, Nov. 18, 1966, 51,823/66; May 31, 1967, 25,076/67
Int. Cl. C07d 91/34, 91/32
U.S. Cl. 260—302        36 Claims

ABSTRACT OF THE DISCLOSURE 2,4-diarylthiazoles substituted at position 5 by a polycarbon carboxylic acid group are useful as anti-inflammatory agents. The aryl groups may be phenyl, tolyl, anisyl, halophenyl, naphthyl, thienyl or furyl, and the acid group may be an acetic, propionic, or higher acid group. The products appear to be less ulcerogenic than anti-inflammatory agents now in general use.

---

This invention relates to a novel group of thiazoles containing aryl groups in the 2- and 4-positions and an aliphatic acid group, or a derivative thereof, in the 5-position, to processes for the preparation thereof, to pharmaceutical compositions containing such thiazoles, and to the use of such compositions for the relief of inflammation.

The present invention provides 2,4-diarylthiazoles of the general Formula I (I) 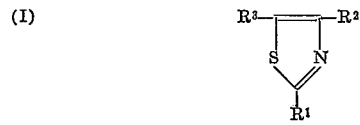

and acid addition salts thereof, in which $R^1$ and $R^2$ are the same or different and are substituted or unsubstituted aryl groups (which may be heteroaryl groups) and $R^3$ is an aliphatic carboxylic acid radical containing at least two carbon atoms, or a derivative thereof. The radicals $R^1$ and $R^2$ may be monocyclic or bicyclic aromatic carbocyclic radicals, (such as phenyl or naphthyl radicals) or may be heterocyclic aryl radicals (such as thienyl or furyl radicals) any of which radicals may be substituted but for simplicity $R^1$ and $R^2$ are referred to herein as aryl radicals. $R^3$ may for example contain 2 to 6, prefearbly 2 to 4 carbon atoms, and can be a straight chain or branched aliphatic acid radical, or a derivative thereof, e.g., an acetic, n-propionic, isopropionic, ni-butyric or isobutyric acid radical, or a derivative thereof, for example an ester or nitrile.

The compounds of the above general formula exhibit pharmacological activity, for example anti-inflammatory activity as shown by test on laboratory animals, and are intermediates in the preparation of other substituted thiazoles. Examples of tests which can indicate that a compound has anti-inflammatory activity are those described by Winter et al. in Proc. Soc. Exp. Biol. Med. III, 544 (1962); Buttle et al. in Nature 179, 629 (1957); Konzett and Rossler in Arch. Path. Pharmac. 195, 71 (1940) and Newbould in Brit. Journ. Pharm. Chemoth. 21, 127–137 (1963).

The compounds of the above general formula may be prepared by suitable general methods known for forming an appropriately substituted thiazole ring, for example, by cyclising reactants appropriately substituted by radicals $R^1$—, $R^2$— and $R^3$— to form the said thiazole, if desired carrying out any after-reactions, and if desired forming an acid addition salt thereof.

Thus, an α-haloketone of the general Formula II (II) 

may be reacted with a thioamide of the general Formula III (III) 

in which $R^1$ and $R^2$ have the meanings defined above, Hal is a halogen atom, (for example chlorine or bromine) and $R^4$ has the same meaning as $R^3$ or is a radical convertible thereto, (e.g., a carboxyl radical, a derivative thereof, or a halomethyl radical) and if necessary the thiazole obtained is converted to a desired thiazole of general Formula I.

The α-haloketones of general Formula II can be prepared in known manner, for example by halogenating (e.g., brominating) the products of Friedel-Crafts reactions between optionally substituted aromatic (or heteroaromatic) hydrocarbons and appropriate anhydrides, e.g., succinic, glutaric or methyl succinic anhydride. Ether has been preferred as solvent for the halogenation. The thioamides of general Formula III generally may be prepared by the method of Fairfull et al. (Journal of the Chemical Society 1952, 742) from the corresponding nitriles.

We have found it particularly convenient to react an acid of general Formula II, (i.e., $R^4$ contains a —COOH group and preferably is an acetic or propionic acid group), in which Hal is a bromine atom with the appropriate thioamide. The reaction is preferably carried out in a solvent at room temperatures or above, e.g., up to the boiling point of the solvent. When the reaction is carried out in the absence of a base and in the present of an alcohol, for example ethanol, the product obtained generally is the ester which can be hydrolysed to the acid if desired. On the other hand if another solvent is used, or if an alcohol (preferably isopropanol) is used as solvent in the presence of a base (e.g., analkali metal carbonate) the acid group $R^3$ generally is obtained directly, thus avoiding the necessity of having to effect a hydrolysis if the acid is desired. It is preferable to add the base (for example anhydrous sodium carbonate) to the reaction mixture at the start of the reaction as this generally improves the yield and/or assists in separating the desired product.

Alternatively, phosphorus pentasulphide may be used to cyclise an α-acylamino carbonyl compound of the general formula:

(IV) 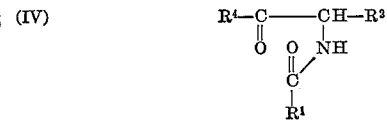

in which $R^1$ and $R^2$ and $R^4$ have the meanings defined above and, if necessary to radical $R^4$ can then be converted to a radical $R^3$. The cyclisation reaction generally may be carried out at room temperatures or above, e.g., temperatures of from 15° C. to the boiling point of the solvent used.

The compounds of general Formula IV may be prepared by reacting a compound of the formula:

(V) 

(which may be made by reacting an aryl actic ester with an alkali acetic ester and halogenating the product) with a salt of an amide of the general formula:

(VI) 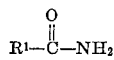

$R^1$, $R^2$, Hal and $R^4$ having the meanings defined above.

When $R^4$ is a —COOH radical or a derivative thereof, or a halomethyl radical in either of the above processes, the product initially obtained is a thiazole of general Formula I but in which $R^3$ is replaced by the radical $R^4$. In such cases the radical $R^4$ then has to be converted to a radical $R^3$, to give a compound of general Formula I, by means of a homologation reaction. For example, if $R^4$ is a carboxyl radical, homologation may be effected by an Arndt-Eistert reaction by forming the corresponding acid halide, reacting this with diazomethane, and treating the diazoketone formed with water and a catalyst (e.g., colloidal silver). Similarly, when $R^4$ is a halomethyl radical, reaction with a cyanide (e.g., potassium cyanide) yields the nitrile which can be hydrolysed.

After preparing a thiazole of general Formula I, the radical $R^3$ may optionally be converted to another radical $R^3$ in known manner. For example, if $R^3$ is an aliphatic acid nitrile or amide radical, the acid can be obtained therefrom, if desired, by hydrolysis. The ester can be obtained from the acid by reaction with an alcohol, and the hydroxamic acid derivative can be obtained from an ester by reaction with hydroxylamine. An acyloxymethyl ester can be obtained by reacting the acid or a salt thereof (e.g., an alkali metal or amine salt) with an acyloxymethyl halide such as an acetoxymethyl halide. The amide can be obtained from the nitrile by hydrolysis, from the acid or a functional derivative thereof by reaction with ammonia or from the ammonium salt by heating.

It is apparent that if substituents are present in the aryl rings of the starting materials, they should be inert to the reactions carried out. If necessary, a reactive substituent (e.g. an amino radical) can be blocked by standard methods while the reaction is being carried out and the blocking agent removed at the end of the reaction.

Examples of aryl radicals $R^1$ and $R^2$ are phenyl, naphthyl, thienyl and furyl radicals, such as unsubstituted phenyl or phenyl substituted by halogen (e.g., fluorine, chlorine, or bromine), lower alkyl radicals containing up to 6 and preferably up to four carbon atoms (e.g., methyl, ethyl, propyl, isopropyl, n-isobutyl), lower alkoxy radicals containing up to 6 and preferably up to 4 carbon atoms (e.g. methoxy, ethoxy and propoxy), amino substituted amino (e.g. dimethylamino), nitro or by trihalomethyl (e.g., trifluoromethyl) radicals, or substituted or unsubstituted naphthyl, thienyl or furyl radicals (e.g., 1- or 2-naphthyl, 2- or 3-thienyl or 2- or 3-furyl). When substituents are present in the phenyl rings, they can occupy positions numbered from 2 to 6 around the phenyl rings. Preferably, $R^3$ is acetic or a propionic acid, or a derivative for example a salt, ester, amide or hydroxamic acid derivative thereof.

The 2,4-diaryl thiazoles provided by the invention contain a basic ring nitrogen atom capable of forming acid addition salts with pharmaceutically acceptable acids and the invention also provides such salts.

The invention further provides a pharmaceutical composition which comprises a pharmaceutically active form of a compound provided by the invention and a non-toxic carrier. The pharmaceutically active form generally is when $R^3$ contains a carboxyl group, which may be in amide or salt form. An suitable carrier known in the art can be used.

In such a composition the pharmaceutically acceptable carrier can be a solid or a sterile liquid. Solid form compositions include powders, tablets and capsules. A solid carrier can be one or more substances which may also act as flavouring agents, lubricants, solubilizers, suspending agents, binders, or tablet-disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredients can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier: if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely-divided active ingredient in aqueous starch or sodium carboxymethyl cellulose solution, or in a suitable oil, for instance arachis oil. Liquid pharmaceutical compositions which are sterile solutions or suspensions can be utilized by intramuscular, intraperitoneal or subcutaneous injection. In many instances a compound is orally active and can be administered orally either in liquid or solid composition form.

Preferably the pharmaceutical composition is in unit dosage form. In such form, the composition is sub-divided in unit doses containing appropriate quanities of the active ingredient; the unit dosage form can be a packaged composition, the package containing specific quantities of compositions, for example packeted powders or vials or ampoules. The unit dosage form can be a capsule cachet or tablet itself, or it can be the appropriate number of any these in packaged form. The quantity of active ingredient in a unit dose of composition may be varied or adjusted according to the particular need and the activity of the active ingredient.

The following non-limiting examples illustrate the invention.

EXAMPLE 1

4-(2′-thienyl)-2-(2′-methyphenyl)-thiazol-5-ylacetic acid 2-methyltiobenzamide (5.7 g.), 3-bromo-3-(2′-thenoyl)-propionic acid (10 g.) and anhydrous sodium carbonate (1.8 g.) were heated together in isopropanol (55 ml.) with stirring at 60° C. for 30 minutes. The mixture was then cooled to 40° C. and stirred for a further 60 minutes. After cooling to room temperature, the mixture was allowed to stand overnight and poured slowly into cold water (1 litre). A few drops of conc. hydrochloric acid were added to make the mixture acid and, after standing for a further 30 minutes, the resulting solid was filtered off. The aqueous phase was extracted with ether and the extracts combined with the solid. The ethereal solution was extracted thoroughly with saturated aqueous sodium bicarbonate solution and the aqueous extracts acidified with conc. hydrochloric acid. The oily precipitate from the aqueous phase quickly solidified and, after drying, was recrystallized from benzene. Yield: 6.7 g. (46.2%), M.P. 136–8° C.

*Analysis.*—Found: C, 61.0; H, 4.2; N, 4.3; S, 20.3, $C_{16}H_{13}NO_2S_2$ requires C, 60.9; H, 4.2; N, 4.4; S, 20.3%.

EXAMPLE 2

2-(4'-chlorophenyl)-4-(4'-methoxyphenyl)thiazol-5-ylacetic acid

Following the procedure of Example 1, 4-chlorothiobenzamide (6.25 g.) and 3-bromo-3-(4'-methoxybenzoyl)-propionic acid (10.3 g.) were reacted together in isopropanol (50 ml.) in the presence of sodium carbonate (1.8 g.). After working up in the manner described in that example and recrystallizing from glacial acetic acid/water, the title compound (7.5 g., 57.1%) of M.P. 199–201° C. was obtained.

*Analysis.*—Found: C, 60.0; H, 4.2; 3.7; S, 9.0; Cl, 9.7. $C_{18}H_{14}ClNSO_2$ requires C, 60.1; H, 3.0; N, 3.9; S, 8.9; Cl, 9.9%.

EXAMPLE 3

2-(4'-chlorophenyl)-4-phenylthiazol-5-ylacetic acid

Following the procedure of Example 1, 4-chlorothiobenzamide (14.6 g.) and 3-benzoyl-3-bromopropionic acid (21.8 g.) were reacted together in isopropanol (127 ml.) in the presence of soidum carbonate (4.3 g.). After working up in the manner described in that example and recrystallizing from benzene, the title compound (12.4 g., 44.2) of M.P. 153–5° C. was obtained.

*Analysis.*—Found: C, 62.1; H, 3.8; N, 4.1; S, 9.8; Cl, 10.8. $C_{17}H_{12}ClNO_2S$ requires C, 61.9; H, 3.7; N, 4.3; S, 9.7; Cl, 10.8%.

EXAMPLE 4

2-(4'-chlorophenyl)-4-(2'-thienyl)thiazol-5-ylacetic acid

Following the procedure of Example 1, 4-chlorothiobenzamide (6.3 g.) and 3-bromo-3-(2'-thenoyl)-propionic acid (10 g.) were reacted together in isopropanol (55 ml.) in the presence of sodium carbonate (1.8 g.). After working up in the manner described in that example and recrystallizing from benzene, the title compound (4.8 g., 31.2%) of M.P. 137–9° C. was obtained.

*Analysis.*—Found: C, 53.6; H, 3.2; N, 4.0; S, 19.0; Cl, 10.5. $C_{15}H_{10}ClNO_2S_2$ requires C, 53.6; H, 3.0; N, 4.2; S, 19.1; Cl, 10.6%.

EXAMPLE 5

2,4-di-(4'-methoxyphenyl)thiazol-5-ylacetic acid

Following the procedure of Example 1, 4-methoxythiobenzamide (6.0 g.) and 3-bromo-3-(4'-methoxybenzoyl)-propionic acid (10.3 g.) were reacted together in isopropanol (50 ml.) in the presence of sodium carbonate (1.8 g.). After working up as described in that example and recrystallizing from glacial acetic acid/water, the title compound (8.0 g., 56.3%) of M.P. 176–8° C. was obtained.

*Analysis.*—Found: C, 64.3; H, 5.0; N, 3.9; S, 9.1. $C_{19}H_{17}NSO_4$ requires C, 64.2; H, 4.8; N, 3.9; S, 9.0%.

EXAMPLE 6

4(4'-methoxyphenyl)-2-(2'-methylphenyl)thiazol-5-ylacetic acid

Following the procedure of Example 1, 2-methylthiobenzamide (5.4 g.) and 3-bromo-3-(4'-methoxybenzoyl)-propionic acid (10.3 g.) were reacted together in isopropanaol (50 ml.) in the presence of sodium carbonate (1.8 g.). After working up as described in that example, the title compound (5.4 g., 44.6%) of M.P. 140–1° C. was obtained.

*Analysis.*—Found: C, 67.2; H, 5.1; N, 4.3; S, 9.4. $C_{19}H_{17}NSO_3$ requires C, 67.2; H, 5.1; N, 4.1; S, 9.5%.

EXAMPLE 7

2-(2'-methylphenyl)-4-phenylthiazol-5-ylacetic acid 2-methylthiobenzamide (7.5 g.), 3-benzoyl-3-bromopropionic acid (12.85 g.) and isopropanol (75 ml.) were heated together with stirring for 30 minutes at 60° C. After cooling to 40° C., anhydrous sodium carbonate (2.5 g.) was added to the orange-colored solution and the mixture held at 40° C. for a further 60 minutes. After standing overnight the reaction mixture was poured slowly with stirring into cold water (1 litre) and a few drops of conc. hydrochloric acid added to make the mixture acidic. After standing for 30 minutes, the oily semi-solid layer was separated and retained. The aqueous phase was extracted with ether and the extracts combined with the oily layer. The resulting ether solution was extracted thoroughly with saturated aqueous sodium bicarbonate solution and the aqueous extracts acidified with conc. hydrochloric acid. The resulting oily precipitate quickly solidified and after drying was recrystallized from benzene petroleum ether (60°–80° C.) to give the title compound (3.0 g., 19.4%), M.P. 165–7° C.

*Analysis.*—Found: C, 69.7; H, 5.0; N, 4.4; S, 10.5. $C_{18}H_{15}NO_2S$ requires C, 69.9; H, 4.9; N, 4.5; S, 10.4%.

EXAMPLE 8

2-(3'-methylphenyl)-4-phenylthiazol-5-ylacetic acid

Following the procedure of Example 7, 3-methylthiobenzamide (7.5 g.), 3-benzoyl-3-bromopropionic acid (12.85 g.), isopropanol (75 ml.) and sodium carbonate (2.5 g.) were used to obtain the title compound which was recrystallized from benzene/petroleum ether. Yield. 2.3 g. (15%) M.P. 123–5° C.

*Analysis.*—Found: C, 69.7; H, 4.9; N, 4.5; S, 10.3. $C_{18}H_{15}NO_2S$ requires C, 69.9; H, 4.9; N, 4.5; S, 10.3%.

EXAMPLE 9

2-(4'-methoxyphenyl)-4-phenylthiazol-5-ylacetic acid

Following the procedure of Example 7, 4-methoxythiobenzamide (8.35 g.), 3-benzoyl-3-bromopropionic acid (12.85 g.), isopropanol (75 ml.) and sodium carbonate (2.5 g.) were used to obtain the title compound, which was recrystallized from benzene. Yield: 6.6 g. (40.6%) M.P. 149.5–152° C.

*Analysis.*—Found: C, 66.4; H, 4.6; N, 4.2; S, 9. $C_{18}H_{15}NO_3S$ requires C, 66.4; H, 4.7; N, 4.3; S, 9.9%.

EXAMPLE 10

2-(2'-chlorophenyl)-4-phenylthiazol-5-ylacetic acid

Following the procedure of Example 7, 2-chlorothiobenzamide (8.60 g.), 3-benzoyl-3-bromopropionic acid (12.85 g.), isopropanol (75 ml.) and sodium carbonate (2.5 g.) were used to obtain the title compound, which was recrystallized from benzene. Yield: 4.6 g. (27.6%), M.P. 168–71° C.

*Analysis.*—Found: C, 62.0; H, 3.7; N, 4.2; S, 9.9; Cl, 10.8. $C_{17}H_{12}ClNO_2S$ requires C, 61.9; H, 3.7; N, 4.3; S, 9.7; Cl, 10.8%.

EXAMPLE 11

2-(4'-methylphenyl)-4-phenylthiazol-5-ylacetic acid

Following the procedure of Example 7, 4-methylthiobenzamide (7.5 g.) 3-benzoyl-3-bromopropionic acid (12.85 g.), isopropanol (75 ml.) and sodium carbonate (2.5 g.) were used to obtain the title compound, which was recrystallized from benzene. Yield: 7.9 g. (51.2%), M.P. 170–1° C.

*Analysis.*—Found: C, 70.1; H, 5.0; N, 4.3; S, 10.5. $C_{18}H_{15}NO_2S$ requires C, 69.9; H, 4.9; N, 4.5; S, 10.4%.

EXAMPLE 12

2-(1'-naphthyl)-4-phenylthiazol-5-ylacetic acid

Following the procedure of Example 7, 1-thionaphthamide (14.1 g.), 3-benzoyl-3-bromopropionic acid (19.3 g.), isopropanol (115 ml.) and sodium carbonate (3.75 g.) were used to obtain the title compound, which was recrystallized from benzene/petroleum ether. Yield: 8.6 g. (29.7%), M.P. 145–8° C.

*Analysis.*—Found: C, 73.1; H, 4.4; N, 4.1; S, 9.3. $C_{21}H_{13}NO_2S$ requires C, 73.2; H, 4.4; N, 4.0; S, 9.3%.

EXAMPLE 13

2-(3'-trifluoromethylphenyl)-4-phenylthiazol-5-ylacetic acid

Following the procedure of Example 7, 3-trifluoromethylthiobenzamide (15.3 g.), 3-benzoyl-3-bromopropionic acid (19.3 g.) isopropanol (115 ml.) and sodium carbonate (3.75 g.) were used to obtain the title compound, which was recrystallized from benzene/petroleum ether. Yield: 6.4 g. (23.4%), M.P. 143–5° C.

*Analysis.*—Found: C, 59.6; H, 3.7; N, 3.8; F, 15.6; S, 8.6. $C_{18}H_{12}F_3NO_2S$ requires C, 59.6; H, 3.3; N, 3.9; F, 15.7; S, 8.8%.

EXAMPLE 14

4-(2'-thienyl)-2-(4'-methoxyphenyl)thiazol-5-ylacetic acid

Following the procedure of Example 7, 4-methoxythiobenzamide (6.3 g.), 3-bromo-3-(2'-thenoyl)-propionic acid (10.0 g.), isopropanol (55 ml.) and sodium carbonate (1.8 g.) were used to obtain the title compound, which was recrystallized from benzene. Yield 1.9 g. (13.3%), M.P. 149–151° C.

*Analysis.*—Found: C, 58.0; H, 3.9; N, 4.3; S, 19.5. $C_{16}H_{13}NO_3S_2$ requires C, 58.0; H, 4.0; N, 4.2; S, 19.4%.

EXAMPLE 15

2-(2'-naphthyl)-4-phenylthiazol-5-ylacetic acid

Following the procedure of Example 7, 2-thionaphthamide (14.1 g.), 3-benzoyl-3-bromopropionic acid (19.3 g.), isopropanol (115 ml.) and sodium carbonate (3.75 g.), were used to obtain the title compound, which was recrystallized from benzene. Yield: 14.0 g. (50.6%), M.P. 171–2° C.

*Analysis.*—Found: C, 72.9; H, 4.6; N, 3.9; S, 9.2; $C_{21}H_{15}NO_2S$ requires C, 83.2; H, 4.4; N, 4.0; S, 9.3%.

EXAMPLE 16

2-(4'-methoxyphenyl)-4-(2'-naphthyl)thiazol-5-ylacetic acid

Following the procedure of Example 7, 4-methoxythiobenzamide (22.5 g.), 3-bromo-3-(2'-naphthoyl)propionic acid (40.5 g.), isopropanol (200 ml.) and sodium carbonate (6.6 g.) were used to obtain the title compound, which was recrystallized from glacial acetic acid/water. Yield: 22.4 g. (44.4%), M.P. 160–162° C.

*Analysis.*—Found: C, 70.3; H, 4.5; N, 3.7; S, 8.4. $C_{22}H_{17}NSO_3$ requires C, 70.4; H, 4.6; N, 3.7; S, 8.5%.

EXAMPLE 17

β-[2-(4'-chlorophenyl)-4-phenylthiazol-5-yl] propionic acid 4-benzoyl-4-bromobutyric acid (26.5 g.) and 4-chlorothiobenzamide (16.7 g.) were heated together in refluxing ethanol (80 ml.) for 3½ hours. After cooling, the solvent was evaporated, and the residue was extracted into benzene. The benzene solution was washed with 2 N sodium carbonate solution, water, and then dried (MgSO₄) and evaporated to give the ethyl ester of β-[2-(4'-chlorophenyl) - 4 - phenylthiazol-5-yl]propionic acid as a yellow oil (39.0 g.).

The ester was dissolved in warm ethanol (50 ml.) and treated with a solution of potassium hydroxide (5.7 g.) in ethanol (50 ml.). After 1 hour, most of the solvent was evaporated and water was added, followed by 2 N hydrochloric acid to adjust pH to 4. The mixture was extracted with ether, and the combined extracts were washed with 2 N sodium carbonate solution. The alkaline solution was then acidified and extracted with ether. The ether solution was washed with water, dried (MgSO₄) and evaporated to give β-[2-(4'-chlorophenyl)-4-phenylthiazol-5-yl]propionic acid as a solid (12.6 g., 37%). Recrystallization from benzene gave needle crystals, M.P. 177–178° C.

*Analysis.*—Found: C, 63.0; H, 4.2; N, 4.0; S, 9.4; Cl, 10.1. $C_{18}H_{14}ClNO_2S$ requires C, 62.9; H, 4.1; N, 4.1; S, 9.3; Cl, 10.3%.

EXAMPLE 18

4-(1'-naphthyl)-2-phenylthiazol-5-ylacetic acid

Following the procedure of Example 17, 3-bromo-3-(1'-naphthyl) propionic acid (30.7 g.) and thiobenzamide (13.7 g.) were reacted together in ethanol to give 34.2 g. of the crude ethyl ester, which was hydrolysed to the acid. This was then recrystallized from benzene to yield 4.2 g. (12%) of the title compound, M.P. 166–167° C.

*Analysis.*—Found: C, 73.0; H, 4.6; N, 4.0; S, 9.4. $C_{21}H_{15}NSO_2$ requires C, 73.1; H, 4.4; N, 4.1; S, 9.3%.

EXAMPLE 19

4-(2'-naphthyl)-2-phenylthiazol-5-ylacetic acid

Following the procedure of Example 17, methyl 3-bromo-3-(2'-naphthyl)propionate (29.6 g.) and thiobenzamide (12.6 g.) were reacted together in ethanol to give the crude methyl ester (31.8 g.), which was then hydrolysed to the acid. Recrystallization from benzene yielded 9.9 g. (31%), M.P. 168–169° C.

*Analysis.*—Found: C, 73.0; H, 4.4; N, 4.0; S, 9.4. $C_{21}H_{15}NSO_2$ requires C, 73.1; H, 4.4; N, 4.1; S, 9.3%.

EXAMPLE 20

2,4-diphenylthiazol-5-ylacetic acid ethyl ester 3-bromo-3-benzoylpropionic acid (40 g.) and thiobenzamide (21.3 g.) were heated together in refluxing ethanol (500 ml.) for 8 hours. Most of the ethanol was then evaporated, and a solution of sodium carbonate (10 g.) in water (300 ml.) was added. The mixture was extracted with ether, the ether extracts were combined, washed with water, dried over Na₂SO₄ and evaporated to give pale yellow needle crystals (46.1 g.), M.P. 85–91° C. Recrystallization from ethanol gave the pure ester (35.2 g., 70%), M.P. 95–96° C. as colorless needles.

*Analysis.*—Found: C, 70.6; H, 5.2; N, 4.3; S, 10.1. $C_{19}H_{17}NO_2S$ requires C, 70.6; H, 5.3; N, 4.3; S, 9.9%.

EXAMPLE 21

2-phenyl-4-(4'-methoxyphenyl)thiazol-5-ylacetic acid ethyl ester

Using the procedure shown in Example 20, 3-bromo-3-(4'-methoxybenzoyl)-propionic acid (11 g.) and thiobenzamide (5.25 g.) were reacted to give 2-phenyl-4-(4'-methoxyphenyl)-thiazol-5-ylacetic acid ethyl ester which recrystallized from ethanol as colorless needles (8.3 g., 62%) M.P. 67.5–68.5° C.

*Analysis.*—Found: C, 68.0; H, 5.4; N, 3.9; S, 9.2. $C_{20}H_{19}NO_3S$ requires C, 68.0; H, 5.4; N, 4.0; S, 9.1%.

EXAMPLE 22

2-phenyl-4-(4'-chlorophenyl)thiozol-5-ylacetic acid ethyl ester

Using the procedure shown in Example 20, 3-bromo-3-(4'-chlorobenzoyl)-propionic acid (29.2 g.) and thiobenzamide (13.7 g.) were reacted to give 2-phenyl-4-(4'-chlorophenyl)thiazol-5-ylacetic acid ethyl ester which recrystallized from ethanol as colorless needles (19.9 g., 56%), M.P. 69–70° C.

*Analysis.*—Found: C, 63.8; H, 4.7; N, 3.8; S, 9.1. $C_{19}H_{16}ClNO_2S$ requires C, 63.7; H, 4.5; N, 3.9; S, 9.0%.

EXAMPLE 23

2,4-diphenylthiazol-5-ylacetic acid 2,4-diphenylthiazol-5-ylacetic acid ethyl ester (15 g.) was dissolved in warm ethanol (150 ml.) and potassium hydroxide (10 g.) in water (20 ml.) was added. After 1 hour most of the ethanol was evaporated, and the solution was diluted with water. Concentrated hydrochloric acid was then added until the mixture was just acid, and the oily solid was extracted in ether. The ether extracts were combined, washed with water, dried over $Na_2SO_4$ and evaporated to give a viscous oil (13.5 g.) which slowly crystallized. Recrystallization from benzene gave colorless needle crystals of the acid (12.2 g., 89%) M.P. 152–153° C.

*Analysis.*—Found: C, 69.4; H, 4.2; N, 4.7; S, 10.8. $C_{17}H_{13}NO_2S$ requires C, 69.2; H, 4.4; N, 4.7; S, 10.9%.

EXAMPLE 24

2-phenyl-4-(4'-methoxyphenyl)thiazol-5-ylacetic acid

Using the procedure shown in Example 23, the ethyl ester (5 g.) was hydrolysed to 2-phenyl-4-(4'-methoxyphenyl)-thiazol-5-ylacetic acid which recrystallised from benzene as colorless needles (3.9 g., 85%) M.P. 178.5–179.5° C.

*Analysis.*—Found: C, 66.5; H, 4.5; N, 4.3; S, 10.0. $C_{18}H_{15}NO_3S$ requires C, 66.5; H, 4.6; N, 4.3; S, 9.9%.

EXAMPLE 25

2-phenyl-4-(4'-chlorophenyl)thiazol-5-ylacetic acid

Using the procedure shown in Example 23, the ethyl ester (10 g.) was hydrolysed to 2-phenyl-4-(4'-chlorophenyl)-thiazol-5-ylacetic acid which recrystallized from benzene as colorless needles (4.9 g., 63%) M.P. 161–162° C.

*Analysis.*—Found: C, 62.0; H, 3.7; N, 4.2; S, 9.8; Cl, 10.7. $C_{17}H_{12}ClNO_2S$ requires C, 62.0; H, 3.7; N, 4.2; S, 9.7; Cl, 10.7%.

EXAMPLE 26

α-(2,4-diphenylthiazol-5-yl)propionic acid 3-bromo-3-benzoylisobutyric acid (13.6 g.) and thiobenzamide (6.9 g.) were heated in isopropanol (75 ml.) at 60° C. for 30 minutes. Sodium carbonate (2.5 g.) was then added, and heating was continued for a further 10 minutes. After standing overnight the mixture was diluted with water, and then the aqueous solution was decanted from the resulting oil. The oil was taken up in ether and extracted with dilute aqueous sodium carbonate solution. The basic extract was washed with ether, acidified with hydrochloric acid to pH 4 and then the resulting oil was extracted with ether. The ether extract was washed with water, dried over $Na_2SO_4$ and evaporated to give a pale yellow viscous oil which slowly crystallized. Recrystallization from glacial acetic acid-water gave α-(2,4-diphenyl-thiazol-5-yl)-propionic acid as prismatic crystals (8.6 g., 55%) M.P. 142–144° C.

*Analysis.*—Found: C, 69.9; H, 4.9; N, 4.7; S, 10.3. $C_{18}H_{15}NO_2S$ requires C, 69.9; H, 4.9; N, 4.9; S, 10.3%.

EXAMPLE 27

2-phenyl-4-(2'-thienyl)thiazol-5-ylacetic acid

Using the procedure described in Example 26, 3-bromo-3-(2'-thenoyl)propionic acid (13.2 g.) and thiobenzamide (6.9 g.) were reacted to give 2-phenyl-4-(2'-thienyl)-thiazol-5-ylacetic acid (7.2 g., 48%) as needle crystals M.P. 134.5–135.0° C.

*Analysis.*—Found: C, 59.9; H, 3.7; N, 4.5; S, 21.0. $C_{15}H_{11}NO_2S_2$ requires C, 59.9; H, 3.7; N, 4.65; S, 21.3%.

EXAMPLE 28

2-phenyl-4-(4'-methylphenyl)thiazol-5-ylacetic acid

Using the procedure described in Example 26, 3-bromo-3-(4'-methylbenzoyl)propionic acid (27.1 g.) and thiobenzamide (13.7 g.) were reacted to give 2-phenyl-4-(4'-methylphenyl)thiazol-5-ylacetic acid (9.6 g., 31%) M.P. 168–169° C. from benzene.

*Analysis.*—Found: C, 70.0; H, 5.1; N, 4.6; S, 10.6. $C_{18}H_{15}NO_2S$ requires C, 69.9; H, 4.9; N, 4.5; S, 10.3%.

EXAMPLE 29

2-(4'-methoxyphenyl)-4-phenylthiazol-5-ylacetic acid ethyl ester 4-methoxythiobenzamide (4.2 g.) and 3-benzoyl-3-bromopropionic acid (6.4 g.) were refluxed in ethanol (50 ml.) for 1½ hours. After standing overnight at room temperature a crystalline solid separated. The whole of the reaction mixture was poured into water with stirring and the oily layer separated. The aqueous layer was washed with ether (3×200 ml.) and the extracts combined with the oil. The ether solution was washed with sodium bicarbonate solution dried over anhydrous sodium sulphate and evaporated to dryness. The resulting yellow oil quickly crystallized to a pale yellow crystalline solid. Recrystallization from industrial methylated spirits gave a pale yellowy white solid (3.8 g., 43%) M.P. 60.5–62° C.

EXAMPLE 30

β-[2-(4'-methoxyphenyl)-4-phenylthiazol-5-yl] propionic acid

Following the procedure of Example 17, 4-benzoyl-4-bromobutyric acid (27.1 g.) and 4-methoxythiobenzamide (16.7 g.) were reacted together in ethanol to give the crude ethyl ester (39.5 g.) which was then hydrolysed to the acid. Recrystallization from benzene yielded 6.9 g. (21%), M.P. 174–175° C.

*Analysis.*—Found: C, 67.1; H, 5.0; N, 4.0; S, 9.6. $C_{19}H_{17}NO_3S$ requires C, 67.2; H, 5.1; N, 4.1; S, 9.4%.

EXAMPLE 31

β-[2-(2'-methylphenyl)-4-phenylthiazol-5-yl] propionic acid

Following the procedure of Example 17, 4-benzoyl-4-bromobutyric acid (27.1 g.) and 2-methylthiobenzamide (15.1 g.) were reacted together in ethanol to give the crude ethyl ester (37.5 g.), which was then hydrolysed to the acid. Recrystallization from benzene yielded 5.7 g. (18%), M.P. 107–109° C.

*Analysis.*—Found: C, 70.6; H, 5.4; N, 4.2; S, 9.8. $C_{19}H_{17}NO_2S$ requires C, 70.6; H, 5.3; N, 4.3; S, 9.9%.

EXAMPLE 32

2,4-diphenylthiazol-5-ylacetic acid methyl ester 3-benzoyl-3-bromopropionic acid (29.5 g.) and thiobenzamide (15.7 g.) were heated together for 5 hours in refluxing methanol (300 ml.). On cooling, needle crystals (24 g., 70%) of the methyl ester separated, M.P. 122–123° C.

*Analysis.*—Found: N, 4.5; S, 10.6. $C_{18}H_{15}NO_2S$ requires N, 4.5; S, 10.3%.

EXAMPLE 33

β-(2,4-diphenylthiazol-5-yl)propionic acid 4-benzoyl-4-bromobutyric acid (27.1 g.) and thiobenzamide were heated in refluxing methanol (300 ml.) for 6 hours. Most of the methanol was then evaporated and water was added. The resulting mixture was extracted with ether, and the combined extracts were washed with sodium carbonate solution, water and then dried ($Na_2SO_4$)

Evaporation of the solvent gave the methyl ester of β-(2,4-diphenylthiazol-5-yl)propionic acid (23.3 g.) as a yellow oil.

The ester was dissolved in warm ethanol (200 ml.) and treated with a solution of potassium hydroxide (10 g.) in water (20 ml.). After 1½ hours, the solution was partially evaporated and then poured into water. Acidification with conc. hydrochloric acid yielded an oil which was extracted with ether. The combined extracts were washed with water, dried ($Na_2SO_4$) and evaporated to give an oil which slowly solidified (15.6 g., 50%). Recrystallization from ethanol gave the acid as long colorless needles, M.P. 150° C.

*Analysis.*—Found: C, 69.6; H, 5.0; N, 4.4; S, 10.2. $C_{18}H_{15}NO_2S$ requires C, 69.9; H, 4.9; N, 4.5; S, 10.3%.

EXAMPLE 34

2,4-diphenylthiazol-5-ylacetamide

Methyl 2,4-diphenylthiazol-5-ylacetate (1.9 g.) in methanol (25 ml.) and 0.88 ammonium hydroxide solution (25 ml.) was heated in a sealed tube at 90° C. for 5 hours. On cooling, needle crystals of the amide (0.6 g., 33%) were filtered off. Recrystallization from benzene gave long needles, M.P. 209–210° C.

*Analysis.*—Found: C, 69.1; H, 4.9; N, 9.7; S, 11.0. $C_{17}H_{14}N_2OS$ requires C, 69.5; H, 4.8; N, 9.5; S, 10.9%.

EXAMPLE 35

4-(4'-chlorophenyl)-2-phenylthiazol-5-ylacetamide 4-(4'-chlorophenyl) - 2 - phenylthiazol-5-ylacetic acid (2.0 g.) in dry tetrahydrofuran (50 ml.) was cooled at 0° C. and then dry triethylamine (0.68 g.) followed by ethylchloroformate (0.73 g.) were added dropwise; the temperature of the reaction was maintained between 0–5° C. to give the mixed anhydride. After 0.5 hours, aqueous ammonia (0.35 g., S.G. 0.88) was added dropwise. The mixture was stirred at room temperature overnight (14 hours) and then evaporated to dryness. Water and ethyl acetate were added to the solid, and the ethyl acetate layer was separated, dried ($MgSO_4$), and evaporated to give a solid. The solid was washed well with benzene to leave needle crystals of the amide (0.32 g., 15%), M.P. 223–4° C.

Following the procedure of Example 34 or 35, other amides according to the invention can be made, including 2 - phenyl-4-(2'-thienyl)thiazol-5-ylacetamide, β-[2-(4'-chlorophenyl) - 4 - phenylthiazol-5-yl]propionamide, 4-(2'-thienyl) - 2 - (2'-methylphenyl)-thiazol-5-ylacetamide and α-(2,4-diphenylthiazol-5-yl)propionamide.

EXAMPLE 36

2-(2'-methoxyphenyl)-4-phenylthiazol-5-ylacetic acid

2 - methoxythiobenzamide (4.20 g.), 3 - benzoyl-3-bromopropionic acid (6.40 g.) and anhydrous sodium carbonate (1.25 g.) were added to isopropanol (40 ml.) and the mixture heated with stirring at 60° C. for 30 mins. After a further 1 hour at 40° C. the mixture was cooled to room temperature and poured into water (500 ml.). The mixture was acidified by the addition of a few drops of concentrated hydrochloric acid and a thick oil separated. The aqueous phase was extracted with ether (2×100 ml.) and the axtracts combined with the oil. The resulting solution was extracted with saturated sodium bicarbonate solution (3×100 ml.) and the extracts acidified with concentrated hydrochloric acid. The resulting pale yellow solid was filtered off, dried, and recrystallized from glacial acetic acid/water. Yield 6.4 g. (78.3%); M.P. 179–180.5° C.

*Analysis.*—Found: C, 66.4; H, 4.6; N, 4.5; S, 9.8. $C_{18}H_{15}NO_3S$ requires C, 66.45; H, 4.65; N, 4.3; S, 9.8%.

EXAMPLE 37

2-(4'-chloro-2'-methoxyphenyl)-4-phenylthiazol-5-ylacetic acid (a) The procedure of Example 36 was followed, but using 4-chloro - 2 - methoxythiobenzamide (50 g.), 3-benzoyl - 3 - bromopropionic acid (6.4 g.), anhydrous sodium carbonate (1.25 g.) and isopropanol (40 ml.) to give the title compound. Yield 4.5 g. (64.6%) M.P. 204–5° C.

*Analysis.*—Found: C, 58.9; H, 3.9; N, 3.8; Cl, 10.1; S, 9.2. $C_{18}H_{14}ClNO_3S$ requires C, 60.1; H, 3.9; N, 3.9; Cl, 9.85; S, 8.9%.

(b) The 4 - chloro - 2 - methoxythiobenzamide used as starting material was prepared as follows. (This method is generally applicable to the preparation of the thioamides.)

4-chloro-2-methoxybenzonitrile (26.5 g.) was dissolved in a mixture of dry pyridine (22 ml.) and triethylamine (21 ml.) and hydrogen sulphide passed through the mixture until the nitrile had been completely converted to the thioamide (about 15 hours). The reaction mixture was poured into water (500 ml.) and the resulting precipitate filtered off. After air drying, the product was recrystallized from benzene. Yield 24.1 g. (75.7%) M.P. 149–150° C.

Following the synthetic methods above exemplified, 2 - (2' - chloro - 6' - methylphenyl)-4-phenylthiazol-5-ylacetic acid (M.P. 217–9° C.), 2 - (4' - methoxy-2'-methylphenyl - 4 - phenylthiazol - 5 - ylacetic acid (M.P. 136–8° C.), 2 - (2',6' - dichlorophenyl) - 4 - phenylthiazol-5-ylacetic acid (M.P. 147–9° C.), 4 - phenyl - 2-(2',6'-dimethylphenyl)thiazol - 5 - ylacetic acid (M.P. 203–5° C.), 2-4'-chloro-2'-methylphenyl - 4 - phenylthiazol - 5 - ylacetic acid (M.P. 175–7° C.), 4-(2'-napthyl) - 2 - (2'-methylphenyl)thiazol-5-ylacetic acid (M.P. 171–2° C.), 2-(2',4'-dimethoxyphenyl)-4-phenylthiazol - 5 - ylacetic acid (M.P. 157–9° C.), 2-(4'-N,N-dimethylaminophenyl) - 4 - phenylthiazol - 5 - ylacetic acid (M.P. 144–6° C.), 2 - (2',3'-dimethylphenyl)-4-phenylthiazol - 5 - ylacetic acid (M.P. 143–5° C.), 2-(2'-4' - dichlorophenyl) - 4 - phenylthiazol - 5 - ylacetic acid (M.P. 158–160° C.), 2,4 - di-(4' - chlorophenyl) thiazol - 5 - ylacetic acid methyl ester and 2,4-di-(4'-chlorophenyl)thiazol - 5 - ylacetic acid (M.P. 175–7° C.), were also prepared.

Other compounds of general Formula I which can be prepared following the synthetic methods given above include 4-(2' - furyl) - 2 - phenylthiazol - 5 - ylacetic acid, 2 - (4'-bromophenyl) - 4 - phenylthiazol - 5 - ylacetic acid, 2 - (4' - fluorophenyl) - 4 - phenylthiazol-5-ylacetic acid, 2 - (4 - nitrophenyl) - 4 - phenylthiazol-5-ylacetic acid, α-(2,4-diphenylthiazol - 5 - yl)propionic acid ethyl ester, β-[2-(4'-chlorophenyl) - 4 - phenylthiazol - 5-yl]propionic acid ethyl ester, α-(2,4 - diphenylthiazol-5-ly)propionic acid methyl ester, β-[2-(4'-chlorophenyl)-4 - phenylthiazol - 5 - yl]propionic acid methyl ester, 2-(4' - aminophenyl) - 4 - phenylthiazol - 5 - ylacetic acid, 2-(4'-isobutylphenyl)-4-phenylthiazol - 5 - ylacetic acid and 2-(4'-propoxyphenyl) - 4 - phenylthiazol-5-ylacetic acid.

What is claimed is:

1. A 2,4-diarylthiazole-5-polycarbon carboxylic acid compound having the structural formula:

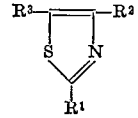

wherein $R^1$ and $R^2$ are each radicals of the group consisting of thienyl, furyl, naphthyl, phenyl, and phenyl bearing from one to two substituents of the group consisting of (lower)alkyl, (lower)alkoxy, chloro, bromo, fluoro, di-(lower alkyl)amino, nitro, amino and trifluoromethyl, and wherein $R^3$ is a radical from the group consisting of —$CH_2$—$CO_2H$, —$CH_2$—$CH_2$—$CO_2H$, —$CHCH_3$—$CO_2H$, —$CH_2$—$CO.NH_2$, —$CH_2CO_2CH_3$, —$CH_2CO_2C_2H_5$, —$CHCH_3$—$CONH_2$,

—$CH_2$—$CH_2$—$CO.NH_2$

—$CH_2CH_2$—$CO_2C_2H_5$, —$CHCH_3$—$CO_2C_2H_5$,

—$CH_2$—$CH_2$—$CO_2CH_3$ and —$CHCH_3$—$CO_2CH_3$.

2. A compound according to claim 1 which is 4-(2'-thienyl)-2-(2'-methylphenyl)thiazol-5-ylacetic acid.

3. A compound according to claim 1 which is 2-(4'-chlorophenyl)-4-(4' - methoxyphenyl)thiazol-5 - ylacetic acid.

4. A compound according to claim 1 which is 2-(4'-chlorophenyl)-4-phenylthiazol-5-ylacetic acid.

5. A compound according to claim 1 which is 2-(4'-chlorophenyl)-4-(2'-thienyl)thiazol-5-ylacetic acid.

6. A compound according to claim 1 which is 2,4-di-(4'-methoxyphenyl)thiazol-5-ylacetic acid.

7. A compound according to claim 1 which is 4-(4'-methoxyphenyl)-2-(2' - methylphenyl)thiazol - 5-ylacetic acid.

8. A compound according to claim 1 which is 2-(2'-methylphenyl)-4-phenylthiazol-5-ylacetic acid.

9. A compound according to claim 1 which is 2-(3'-methylphenyl)-4-phenylthiazol-5-ylacetic acid.

10. A compound according to claim 1 which is 2-(4'-methoxyphenyl)-4-phenylthiazol-5-ylacetic acid.

11. A compound according to claim 1 which is 2-(2'-chlorophenyl)-4-phenylthiazol-5-ylacetic acid.

12. A compound according to claim 1 which is 2-(4'-methylphenyl)-4-phenylthiazol-5-ylacetic acid.

13. A compound according to claim 1 which is 2-(1'-naphthyl)-4-phenylthiazole-5-ylacetic acid.

14. A compound according to claim 1 which is 2-(3'-trifluoromethylphenyl)-4-phenylthiazol-5-ylacetic acid.

15. A compound according to claim 1 which is 4-(2'-thienyl)-2-(4'-methoxyphenyl)-thiazol-5-ylacetic acid.

16. A compound according to claim 1 which is 2-(2'-naphthyl)-4-phenyithiazol-5-ylacetic acid.

17. A compound according to claim 1 which is 2-(4'-methoxyphenyl)-4-(2'-naphthyl)-thiazol-5-ylacetic acid.

18. A compound according to claim 1 which is β-[2-(4'-chlorophenyl)-4-phenylthiazol-5-yl]-propionic acid.

19. A compound according to claim 1 which is 4-(1'-naphthyl)-2-phenylthiazol-5-ylacetic acid.

20. A compound according to claim 1 which is 4-(2'-naphthyl)-2-phenylthiazol-5-ylacetic acid.

21. A compound according to claim 1 which is 2,4-diphenylthiazol-5-ylacetic acid ethyl ester.

22. A compound according to claim 1 which is 2-phenyl-4-(4'-methoxyphenyl)thiazol-5-ylacetic acid ethyl ester.

23. A compound according to claim 1 which is 2-phenyl-4-(4'-chlorophenyl)thiazol-5-ylacetic acid ethyl ester.

24. A compound according to claim 1 which is 2,4-diphenylthiazol-5-ylacetic acid.

25. A compound according to claim 1 which is 2-phenyl-4-(4'-methoxyphenyl)thiazol-5-ylacetic acid.

26. A compound according to claim 1 which is 2-phenyl-4-(4'-chlorophenyl)thiazol-5-ylacetic acid.

27. A compound according to claim 1 which is α-(2,4-diphenylthiazol-5-yl)propionic acid.

28. A compound according to claim 1 which is 2-phenyl-4-(2'-thienyl)thiazol-5-ylacetic acid.

29. A compound according to claim 1 which is 2-phenyl-4-(4'-methylphenyl)thiazol-5-ylacetic acid.

30. A compound according to claim 1 which is 2-(4'-methoxyphenyl)-4-phenylthiazol - 5 - ylacetic acid ethyl ester.

31. A compound according to claim 1 which is β-[2-(4'-methoxyphenyl)-4-phenylthiazol-5-yl]propionic acid.

32. A compound according to claim 1 which is β-[2-(2'-methylphenyl)-4-phenylthiazol-5-yl]propionic acid.

33. A compound according to claim 1 which is 2,4-diphenylthiazol-5-ylacetic acid methyl ester.

34. A compound according to claim 1 which is β-(2,4-diphenylthiazol-5-yl)propionic caid.

35. A compound according to claim 1 which is 2,4-diphenylthiazol-5-ylacetamide.

36. A compound according to claim 1 which is 4-(4'-chlorophenyl)-2-phenylthiazol-5-ylacetamide.

References Cited

FOREIGN PATENTS 1,099,389   1/1968   Great Britain.

ALEX MAZEL, Primary Examiner

R. J. GALLAGHER, Assistant Examiner

U.S. Cl. X.R.

260—332.2, 521, 558, 520, 515, 559; 424—270